United States Patent
Pierson et al.

(10) Patent No.: US 11,871,233 B2
(45) Date of Patent: Jan. 9, 2024

(54) SYSTEM AND METHOD FOR PROXIMITY DETECTION WITH SINGLE-ANTENNA DEVICE

(71) Applicant: Trustees of Dartmouth College, Hanover, NH (US)

(72) Inventors: Timothy J. Pierson, Hanover, NH (US); Ronald Peterson, Brattleboro, VT (US); David F. Kotz, Lyme, NH (US)

(73) Assignee: Trustees of Dartmouth College, Hanover, NH (US)

( * ) Notice: Subject to any disclaimer, the term of this patent is extended or adjusted under 35 U.S.C. 154(b) by 687 days.

(21) Appl. No.: 17/050,764

(22) PCT Filed: Apr. 26, 2019

(86) PCT No.: PCT/US2019/029395
§ 371 (c)(1),
(2) Date: Oct. 26, 2020

(87) PCT Pub. No.: WO2019/210201
PCT Pub. Date: Oct. 31, 2019

(65) Prior Publication Data
US 2021/0235273 A1    Jul. 29, 2021

Related U.S. Application Data

(60) Provisional application No. 62/663,543, filed on Apr. 27, 2018.

(51) Int. Cl.
*H04W 12/122* (2021.01)
*H04W 4/80* (2018.01)
(Continued)

(52) U.S. Cl.
CPC ......... *H04W 12/122* (2021.01); *G01S 5/0284* (2013.01); *H04W 4/80* (2018.02);
(Continued)

(58) Field of Classification Search
CPC ..... H04W 12/122; H04W 4/80; H04W 24/08; H04W 84/12; H04W 4/023; H04W 12/12;
(Continued)

(56) References Cited

U.S. PATENT DOCUMENTS

| 9,608,698 B2 * | 3/2017 | Sessink | G06K 19/0724 |
| 2007/0025265 A1 * | 2/2007 | Porras | H04W 12/122 370/252 |

(Continued)

FOREIGN PATENT DOCUMENTS

| EP | 3570578 A1 * | 11/2019 | H04W 12/06 |
| WO | WO 2019/210201 A1 | 10/2019 | |
| WO | WO 2022/253664 A1 * | 12/2022 | H04W 4/80 |

OTHER PUBLICATIONS

Yu et al, "Discussion on Amplitude—Frequency Characteristics and Phase-shift Characteristics of Wireless Communication Signals", 2022, 2022 IEEE 5th International Conference on Information Systems and Computer Aided Education (ICISCAE), p. 1-5.*

(Continued)

*Primary Examiner* — Christopher A Revak
(74) *Attorney, Agent, or Firm* — Neal, Gerber & Eisenberg LLP

(57) ABSTRACT

A single-antenna device includes a single antenna, at least one processor, and at least one memory. The single-antenna device is operable to receive a signal including at least one frame. Each of said frame includes a repeating portion. The single-antenna device determines a difference of phase and amplitude of the repeating portion and further determines whether the signal is transmitted from a trusted source based (Continued)

at least in part on the difference of phase and amplitude of the repeating portion.

22 Claims, 10 Drawing Sheets

(51) Int. Cl.
  *G01S 5/02* (2010.01)
  *G16Y 40/50* (2020.01)
  *G16Y 40/60* (2020.01)
(52) U.S. Cl.
  CPC .......... *G01S 2205/07* (2020.05); *G16Y 40/50* (2020.01); *G16Y 40/60* (2020.01)
(58) Field of Classification Search
  CPC .... G01S 5/0284; G01S 2205/07; G01S 11/02; G16Y 40/50; G16Y 40/60
  See application file for complete search history.

(56) References Cited

U.S. PATENT DOCUMENTS

| | | | |
|---|---|---|---|
| 2009/0202073 A1* | 8/2009 | Singhal | G06F 7/582 708/250 |
| 2011/0029370 A1 | 2/2011 | Roeding et al. | |
| 2011/0092245 A1 | 4/2011 | Noonan et al. | |
| 2013/0154887 A1* | 6/2013 | Hein | G01S 3/023 343/703 |
| 2016/0226892 A1 | 8/2016 | Sen et al. | |

OTHER PUBLICATIONS

The United States Patent and Trademark Office, International Search Report in International Application No. PCT/US2019/029395 (dated Jul. 10, 2019).

The United States Patent and Trademark Office, Written Opinion of The International Search Authority in International Application No. PCT/US2019/029395 (dated Jul. 10, 2019).

* cited by examiner

SYSTEM AND METHOD FOR PROXIMITY DETECTION WITH SINGLE-ANTENNA DEVICE

CROSS REFERENCE TO RELATED APPLICATIONS

This patent application is a National Stage Entry of International Patent Application No. PCT/US2019/029395, filed on Apr. 26, 2019, which claims priority to U.S. Provisional Patent Application No. 62/663,543, filed on Apr. 27, 2018. The entire contents of each of the aforementioned applications are fully incorporated herein by reference.

FEDERALLY SPONSORED RESEARCH OR DEVELOPMENT

This invention was made with government support under CNS-1329686 awarded by the National Science Foundation. The government has certain rights in the invention.

TECHNICAL FIELD

The present invention relates to a system and method for proximity detection with a single-antenna device and, in particular, a system and method for detecting proximity between a transmitting device and a single-antenna device based on a repeating portion of a wireless signal received at the single-antenna device.

BACKGROUND

Billions of Internet of Things (IoT) devices are envisioned to be deployed in the near future, with new devices entering and exiting local environments in an unpredictable manner. These devices are projected to collect and share data among each other, some of which may be privacy sensitive or have security implications.

Securely transferring data between two devices that have not previously shared a secret is a difficult task. Previous solutions such as Diffie-Hellman key exchange are subject to well-known Man-in-The-Middle attacks. Other solutions such as Public Key Infrastructure require support from trusted servers on the Internet. Furthermore, as the number of wireless devices grows, manually configuring each device to communicate with its neighbors becomes increasingly impractical. Indeed, manually entering secret keys on each device will likely become extraordinarily cumbersome if predictions of the number of IoT devices coming soon are even remotely accurate.

Therefore, there is a need for new methods and systems to facilitate reliable and secure communication between two devices in close physical proximity, even when those devices have never met nor shared a key.

U.S. Provisional Application No. 62/554,867, filed on Sep. 6, 2017 provides a method for secure short-range information exchange between a multi-antenna device and a target device. However, a single-antenna device cannot use a multi-antenna-based method and, therefore, has no way to verify its proximity to the target device. These single-antenna devices, such as IoT devices, may be vulnerable to attack.

SUMMARY OF THE INVENTION

The present disclosure provides methods and systems for securely transferring data between a single-antenna device and a transmitting device.

In one aspect, this disclosure provides a method for establishing trust between a single-antenna device and a transmitting device. The method comprises placing the single-antenna device and the transmitting device in close physical proximity to each other. In certain embodiments, the single-antenna device and the transmitting device are placed less than ten centimeters apart from each other, alternatively less than less than nine centimeters apart from each other, alternatively less than eight centimeters apart from each other, alternatively less than seven centimeters apart from each other, alternatively less than six centimeters apart from each other, alternatively less than five centimeters apart from each other, alternatively less than four centimeters apart from each other, alternatively less than three centimeters apart from each other, alternatively less than two centimeters apart from each other, or alternatively less than one centimeter apart from each other. In some such embodiments, the single-antenna device and the transmitting device are about one centimeter, about two centimeters, about three centimeters, about four centimeters, about five centimeters, about six centimeters, about seven centimeters, about eight centimeters, or about nine centimeters apart from each other. In certain embodiments, the method further comprises transmitting a preamble from the transmitting device. In some such embodiments, the preamble may be a Wi-Fi preamble. In some such embodiments, the preamble comprises at least one long training field (LTF). In some such embodiments, the preamble comprises a repeating portion, such as a repeating portion of the LTF in the Wi-Fi specification (IEEE 802.11). In some such embodiments, the single-antenna device identifies the transmitting device as a trusted transmitting device using the repeating portion of the preamble. For example, when the single-antenna device is physically close to the transmitting device, near-field effects will cause the repeating portions of the preamble to differ in phase and amplitude, and the single-antenna device may use this information to identify the transmitting device as a trusted transmitting device based on its proximity. In certain embodiments, the method is keyless (i.e., the method does not comprise sharing a key between the single-antenna device and the transmitting device).

In one aspect, this disclosure provides a method for determining proximity between a single-antenna device and a transmitting device. In certain embodiments, the single-antenna device is configured to receive a preamble from a transmitting device. In certain embodiments, the method comprises receiving, by the single-antenna device, a preamble transmitted from the transmitting device. In some such embodiments, the preamble comprises at least one long training field (LTF). In some such embodiments, the preamble comprises a repeating portion, such as a repeating portion of the LTF in the Wi-Fi specification (IEEE 802.11). In some such embodiments, the single-antenna device determines the proximity of the transmitting device using the repeating portion of the preamble. For example, when the single-antenna device is physically close to the transmitting device, near-field effects will cause the repeating portions of the preamble to differ in phase and amplitude. On the other hand, when the single-antenna device is remote from the transmitting device (e.g., more than about ten centimeters away), the repeating portions of the preamble will be received with a consistent or substantially consistent phase and amplitude. The single-antenna device may use this information to determine the proximity of the transmitting device (e.g., within about 10 centimeters from the single-antenna device or more remote from the single-antenna device). In certain embodiments, the method is keyless (i.e., the method does not comprise sharing a key between the single-antenna device and the transmitting device).

In one aspect, this disclosure provides a method for determining whether a radio signal originated with a target transmitting device or a potentially adversarial transmitting device. In certain embodiments, a receiving device, such as a single-antenna device, uses the phase and/or amplitude of a preamble received from a transmitting device, particularly a repeating portion of the preamble (e.g., repeating portions of the LTF), to determine whether the receiving device is in close proximity to the transmitting device. For example, when a single-antenna device is physically close to the transmitting device, near-field effects will cause repeating portions of the preamble to differ in phase and amplitude. On the other hand, when the single-antenna device is far from the transmitting device, such as a potential adversary, the repeating portions of the preamble will be received with a consistent or substantially consistent phase and amplitude. In some such embodiments, the single-antenna device identifies a transmitting device as a legitimate device when the phase and/or amplitude of the repeating portions of the preamble received from the transmitting device are different. In other such embodiments, the single-antenna device identifies a transmitting device as a potential adversary when the phase and/or amplitude of the repeating portions of the preamble received from the transmitting device are consistent or substantially consistent. In certain embodiments, the method is keyless (i.e., the method does not comprise sharing a key between the single-antenna device and the transmitting device).

In one aspect, this disclosure provides a system for secure short-range information exchange. The system comprises a single-antenna device comprising an antenna, ATARG, configured to receive wireless data, wherein antenna ATARG is located within about ten centimeters, alternatively within about nine centimeters, alternatively within about eight centimeters, alternatively within about seven centimeters, alternatively within about six centimeters, alternatively within about five centimeters, alternatively within about four centimeters, alternatively within about three centimeters, alternatively within about two centimeters, or alternatively within about one centimeter from a transmitting device. In certain embodiments, the transmitting device is configured to transmit a preamble to the single-antenna device. In certain embodiments, the single-antenna device is configured to receive a preamble from the transmitting device. In some such embodiments, the preamble comprises at least one long training field (LTF). In some such embodiments, the preamble comprises a repeating portion, such as a repeating portion of the LTF in the Wi-Fi specification. In certain embodiments, the single-antenna device is configured to determine proximity with the transmitting device using the preamble, particularly repeating portions of the preamble, received from the transmitting device.

In certain embodiments for any of the aspects described herein, the repeating portion of the preamble comprises a first set of symbols and a second set of symbols, wherein the second set of symbols is identical or substantially identical of the first set of symbols. In some such embodiments, the first set of symbols and the second set of symbols are orthogonal frequency division multiplexing (OFDM) symbols. In some such embodiments, each of the first set of symbols and the second set of symbols is 64-sample OFDM symbols.

In certain embodiments for any of the aspects described herein, the single-antenna device is a wireless device. In certain embodiments for any of the aspects described herein, the single-antenna device is a mobile device, an Internet of Things (IoT) type device, a personal computer (PC), a medical device, a household appliance, a wearable device, a vehicle (e.g., automobile, aircraft) component, or the like.

In certain embodiments for any of the aspects described herein, the method further comprises assessing signal strength of a preamble. In some such embodiments, signal strength is assessed if the repeating portion of the preamble is determined to be different. In some such embodiments, signal strength is assessed as a check to prevent a distant adversary from tricking the single-antenna-device into believing that a malformed preamble is a legitimate signal from a nearby device. For example, if the single-antenna device detects a low strength signal, it determines that the signal came from a distant transmitting device, and not from a physically proximate device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
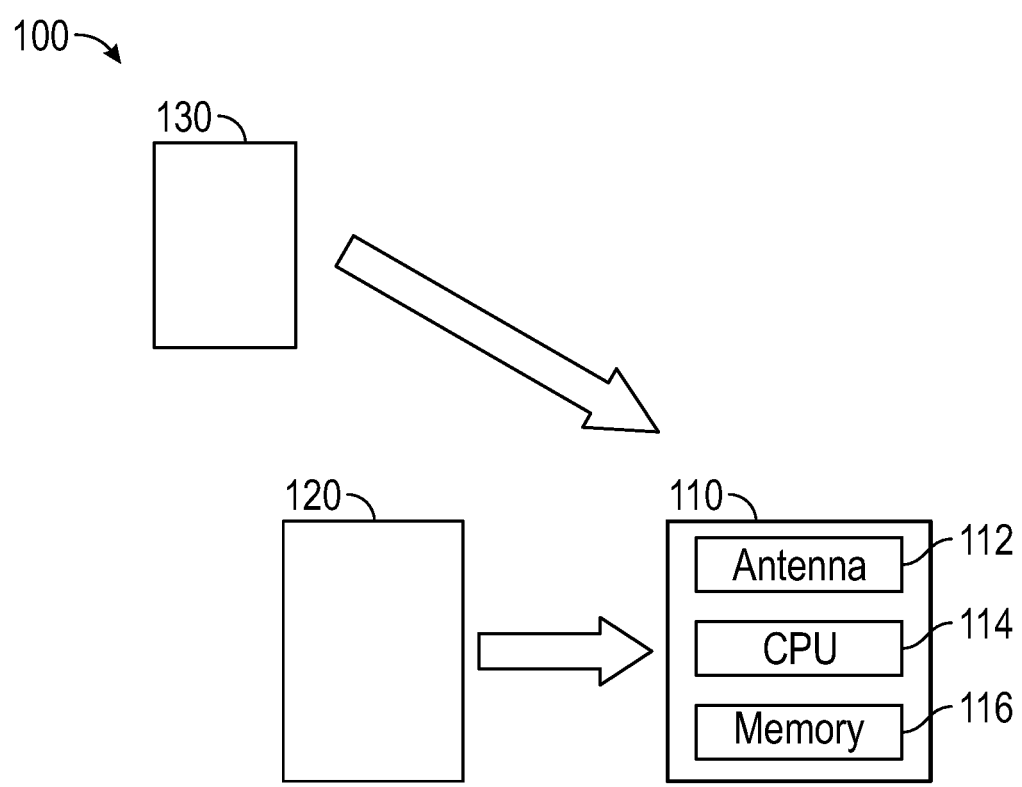
FIG. 1 illustrates an example system comprising a plurality of communication devices.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Mobile IoT devices are ever increasing in modern technology. These IoT devices are envisioned to share data and provide control information among themselves, and some of that information may be privacy sensitive or have security implications. This situation suggests that devices that have never met, nor previously established communication, must somehow have a means to securely communicate that is consistent with user intent.

Securely transferring data between two devices that have not previously established communication and/or received information indicative of each other's identity is a difficult task. The main difficulty is that the newly discovered devices do not have a common point of trust. In these situations, using physical proximity as a basis of trust has been proposed. The idea is that a user can express intent to introduce two devices by bringing said devices in close proximity, at least temporarily, and then taking an action, such as pressing a button. The physical proximity between said devices then forms the basis of trust, thus establishing a secure connection among these devices. A distant adversary, however, may attempt to trick a user's device into accepting a malicious payload by impersonating a nearby legitimate device.

Several techniques have been proposed to combat such impersonation attacks. Often, these techniques rely on short-range out-of-band communication where devices use a secret channel for communication that is impervious to observation or interference by an adversary. These methods frequently require additional hardware such as accelerometers, light sensors, or specialized radio frequency (RF) devices such as Near-field communication (NFC) devices. The required out-of-band hardware may not be present on some devices and these approaches often require complex processing that exceeds the capabilities of many embedded devices. Other approaches to thwarting distant adversaries use in-band RF but rely on multiple antennas to simultaneously measure signal strength to determine proximity or to locate a device in three dimensions. Single-antenna IoT devices with limited hardware that follow standard communication protocols, however, cannot use these techniques.

As described herein, a system and method for establishing secure short-range information exchange between a single-antenna device and a transmitting device comprise: (i) receiving a preamble transmitted from the transmitting device, wherein the preamble comprises at least one repeating portion; and (ii) determining the proximity of the transmitting device to the single-antenna device and/or identifying the transmitting device as a trusted transmitting device or a potentially adversarial transmitting device based on the phase and/or amplitude of the repeating portion of the preamble. In certain embodiments, the repeating portion of the preamble comprises two identical or substantially identical orthogonal frequency division multiplexing (OFDM) symbols. In certain embodiments, the repeating portion of the preamble is defined in a Long Training Field (LTF) of the preamble. In certain embodiments, the single-antenna device identifies the transmitting device as a trusted transmitting device when the phase and/or amplitude of the repeating portions of the preamble received from the transmitting device are different. In certain embodiments, the single-antenna device identifies the transmitting device as an untrusted or adversarial transmitting device when the phase and/or amplitude of the repeating portions of the preamble received from the transmitting device are consistent or substantially consistent. In certain embodiments, the single-antenna device identifies the transmitting device as being within about ten centimeters, alternatively within about nine centimeters, alternatively within about eight centimeters, alternatively within about seven centimeters, alternatively within about six centimeters, alternatively within about five centimeters, alternatively within about four centimeters, alternatively within about three centimeters, alternatively within about two centimeters, or alternatively within about one centimeter of the single-antenna device when the phase and/or amplitude of the repeating portions of the preamble received from the transmitting device are different. In certain embodiments, the single-antenna device identifies the transmitting device as being greater than ten centimeters away from the single-antenna device when the phase and/or amplitude of the repeating portions of the preamble received from the transmitting device are consistent or substantially consistent. In certain embodiments, the single-antenna device: (i) calculates a total Euclidean distance between the phase and/or amplitude of all subcarriers included in the repeating portion of the preamble; (ii) calculates an average preamble deviation over a number of preambles transmitted by the transmitting device based on a sum of all the total Euclidean distances of the number of preambles; (iii) compares the average preamble deviation over the number of preambles transmitted by the transmitting device to a threshold; (iv) identifies the transmitting device as a trusted transmitting device when the average preamble deviation over the number of preambles transmitted by the transmitting device is greater than the threshold; and (v) identifies the transmitting device as an untrusted or potentially adversarial transmitting device when the average preamble deviation over the number of preambles transmitted by the transmitting device is lower than the threshold. In certain embodiments, the single-antenna device, in response to identifying the transmitting device as a potential trusted transmitting device, inquires a separate trusted communication device to confirm whether that trusted communication device sees a matching preamble from a signal transmitted by the transmitting device. In certain embodiments, the single-antenna device, in response to identifying the transmitting device as a potential trusted transmitting device, the single-antenna device: (i) measures a signal strength of each preamble transmitted from the transmitting device; and (ii) responsive to the signal strength of said Wi-Fi-preamble being lower than a threshold, reject said preamble.

FIG. 1 illustrates an example system 100 comprising a plurality of communication devices. The communication devices include a single-antenna device 110, a transmitter 120, and an adversarial communication device 130. The single-antenna device 110 includes a first antenna 112 and at least one processor 114 and memory 116. The first antenna 112 is a single-antenna. For example, the single-antenna may be a half wavelength dipole antenna, a quarter wavelength dipole antenna, a micropatch antenna, a planar inverted-F antenna, or any other type of single-antenna. The processor 114 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 116 may be volatile memory (e.g., RAM, which can include non-volatile RAM, magnetic RAM, ferroelectric RAM, and any other suitable forms), non-volatile memory, unalterable memory, read-only memory, and/or high-capacity storage devices. In some examples, the memory 116 includes multiple kinds of memory, particularly volatile memory and non-volatile memory. The memory 116 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 114, the computer readable medium, and/or within the processor 116 during execution of the instructions. The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

While not illustrated, each of the transmitter 120 and the adversarial communication device 130 may include at least one processor, memory, and antenna.

In certain embodiments, the single-antenna device 110, the transmitter 120, and the adversarial communication device 130 may be a mobile device, portable personal computer, a tablet, a wearable device, etc. Each of the single-antenna device 110, the transmitter 120, and the adversarial communication device 130 is capable of establishing communication with each other and/or other wireless devices via a wireless communication protocol. In the illustrated example, the transmitter 120 is positioned closer to the single-antenna device 110 than the adversarial communication device 130. In the illustrated example, said wireless communication protocol is Wi-Fi. In the illustrated example, the single-antenna device 110 function as a receiver. In the illustrated example, it is assumed that a user wishes to establish secure short-range communication between the single-antenna device 110 and the transmitter 120, and the adversarial communication device 130 is an untrusted device attempting to intercept said communication. In the illustrated example, it is assumed that the single-antenna device 110 and the transmitter 120 have not previously established communication with each other and are currently unaware of each other's identity. The single-antenna device 110 may determine whether a received signal is provided from a trusted source (e.g., the transmitter 120) via proximity detection. Herein, a trusted source refers to a legitimate communication device. The proximity detection involves analyzing a repeating portion of the received signal. Herein, the proximity detection will be described with reference to an exemplary communication protocol, the exemplary communication protocol is Wi-Fi; however, as described later in this disclosure, proximity detection may be performed via other communication protocol that includes a repeating portion. In the example embodiments below, it is assumed that the received signal is a Wi-Fi signal comprising at least one Wi-Fi frame. Details of a Wi-Fi frame will be described with reference to FIG. 2 below.

Figure 2:
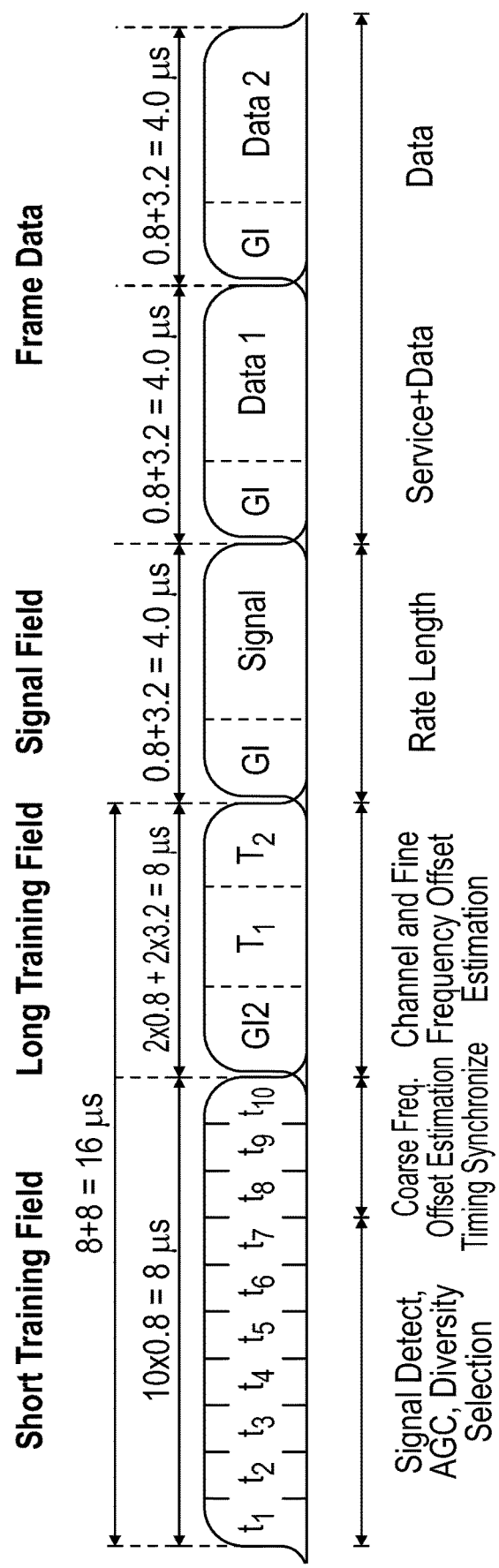
FIG. 2 illustrates the detailed structure of a Wi-Fi frame.

FIG. 2 illustrates the detailed structure of a Wi-Fi frame. The Wi-Fi frame is an Orthogonal Frequency Division Multiplexing (OFDM) Wi-Fi frame. The Wi-Fi frame includes a physical (PHY) layer preamble, a Signal Field, and a Wi-Fi frame's data. The Wi-Fi frame begins with the PHY layer preamble to aid in synchronizing the transmitter 120 and the single-antenna device 110. The PHY layer preamble includes a Short Training Field (STF) and a Long Training Field (LTF). The Wi-Fi frame begins with the STF, followed by the LTF, followed by the Signal Field, and then the Wi-Fi frame's data. The STF includes 10 identical short training symbols (denoted $T_1$ through $T_{10}$ in FIG. 2, where each STF symbol is sampled 16 times, for a total of 160 samples. The STF is used by the single-antenna device 110 for frame detection, Automatic Gain Control (AGC), diversity selection, coarse frequency offset estimation, and rough symbol timing synchronization. The LTF follows the STF and is used by the single-antenna device 110 for fine frequency correction and channel estimation. The LTF includes a 32-sample guard interval GI2 followed by two identical 64-sample OFDM symbols $T_1$ and $T_2$ (i.e., repeating portion). The guard interval together with the two 64-sample OFDM symbols $T_1$ and $T_2$ make a total of 160 samples in the LTF. Details of the two 64-sample OFDM symbols $T_1$ and $T_2$ will be further described with reference to FIG. 3, below. The Signal Field follows the LTF and is encoded with Binary Phase Shift Keying (BPSK). The Signal Field includes information indicative of the number of bytes and the encoding scheme used on the Wi-Fi frame's data. The Wi-Fi frame's data comes after the Signal Field. Each OFDM data symbol included in the Wi-Fi frame's data includes a 16-sample guard interval (denoted GI in FIG. 2) and 64 samples carrying the actual data.

Figure 3:
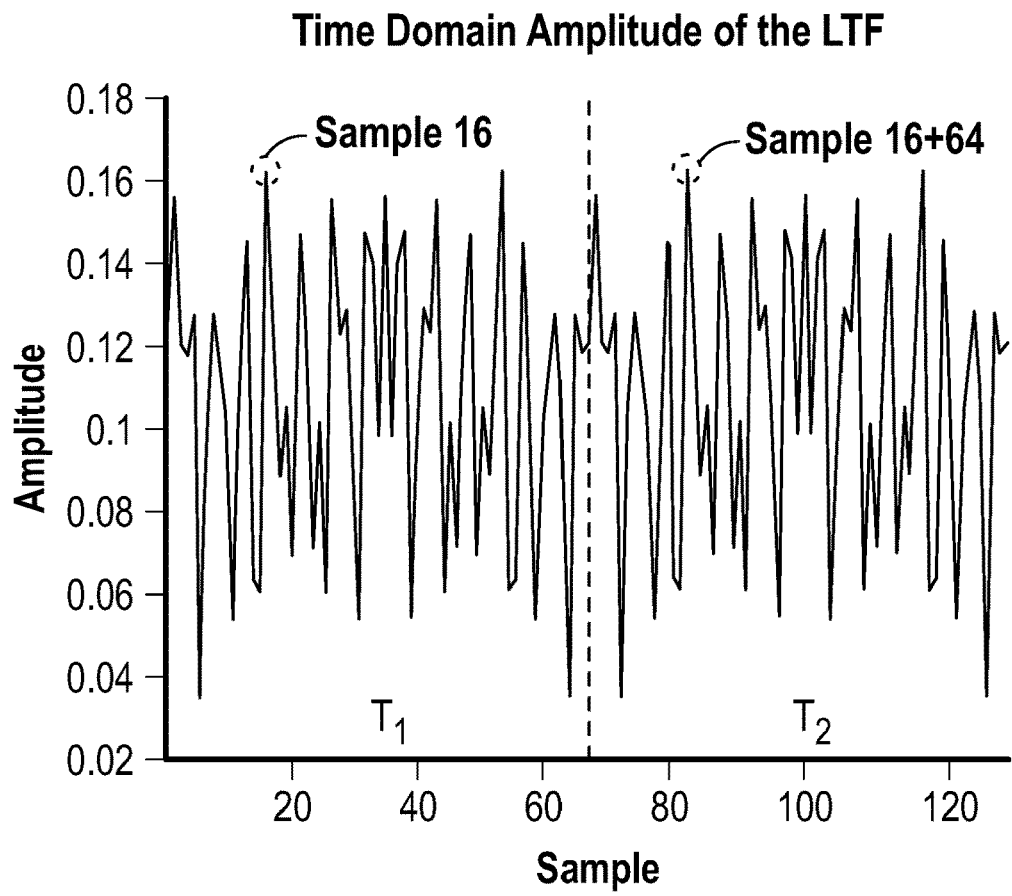
FIG. 3 illustrates an example graph representing two 64-sample OFDM symbols in the LTF of a Wi-Fi frame.

FIG. 3 illustrates an example graph representing two 64-sample OFDM symbols $T_1$ and $T_2$ included in the LTF of the Wi-Fi frame. As mentioned above, the two 64-sample OFDM symbols $T_1$ and $T_2$ are identical. As such, the phase and amplitude of sample i in symbol $T_1$ matches the phase and amplitude of sample i+64 in $T_2$, where i=0 . . . 63. The time-domain samples may be converted into an equivalent frequency-domain representation by taking a Discrete Fourier Transform (DFT). In some examples, the time-domain samples may be converted into the equivalent frequency-domain representation by a Fast Fourier Transform (FFT). Wi-Fi single-antenna device 110 may perform a 64-point FFT over the received time-domain samples to transform the time-domain samples into the frequency domain. The FFT operation yields 64 complex numbers representing the phase and amplitude of 64 subcarriers, indexed from −32 to +31. Table 1 illustrates the two 64-sample OFDM symbols $T_1$ and $T_2$ represented in the frequency domain.

TABLE 1

| ## | Re | Im |
|---|---|---|
| −32 | 0.000 | 0.000 |
| −31 | 0.000 | 0.000 |
| −30 | 0.000 | 0.000 |
| −29 | 0.000 | 0.000 |
| −28 | 0.000 | 0.000 |
| −27 | 0.000 | 0.000 |
| −26 | 1.000 | 0.000 |
| −25 | 1.000 | 0.000 |
| −24 | −1.000 | 0.000 |
| −23 | −1.000 | 0.000 |
| −22 | 1.000 | 0.000 |
| −21 | 1.000 | 0.000 |
| −20 | −1.000 | 0.000 |
| −19 | 1.000 | 0.000 |
| −18 | −1.000 | 0.000 |
| −17 | 1.000 | 0.000 |
| −16 | 1.000 | 0.000 |

TABLE 1-continued

| ## | Re | Im |
| --- | --- | --- |
| −15 | 1.000 | 0.000 |
| −14 | 1.000 | 0.000 |
| −13 | 1.000 | 0.000 |
| −12 | 1.000 | 0.000 |
| −11 | −1.000 | 0.000 |
| −10 | −1.000 | 0.000 |
| −9 | 1.000 | 0.000 |
| −8 | 1.000 | 0.000 |
| −7 | −1.000 | 0.000 |
| −6 | 1.000 | 0.000 |
| −5 | −1.000 | 0.000 |
| −4 | 1.000 | 0.000 |
| −3 | 1.000 | 0.000 |
| −2 | 1.000 | 0.000 |
| −1 | 1.000 | 0.000 |
| 0 | 0.000 | 0.000 |
| 1 | 1.000 | 0.000 |
| 2 | −1.000 | 0.000 |
| 3 | −1.000 | 0.000 |
| 4 | 1.000 | 0.000 |
| 5 | 1.000 | 0.000 |
| 6 | −1.000 | 0.000 |
| 7 | 1.000 | 0.000 |
| 8 | −1.000 | 0.000 |
| 9 | 1.000 | 0.000 |
| 10 | −1.000 | 0.000 |
| 11 | −1.000 | 0.000 |
| 12 | −1.000 | 0.000 |
| 13 | −1.000 | 0.000 |
| 14 | −1.000 | 0.000 |
| 15 | 1.000 | 0.000 |
| 16 | 1.000 | 0.000 |
| 17 | −1.000 | 0.000 |
| 18 | −1.000 | 0.000 |
| 19 | 1.000 | 0.000 |
| 20 | −1.000 | 0.000 |
| 21 | 1.000 | 0.000 |
| 22 | −1.000 | 0.000 |
| 23 | 1.000 | 0.000 |
| 24 | 1.000 | 0.000 |
| 25 | 1.000 | 0.000 |
| 26 | 1.000 | 0.000 |
| 27 | 0.000 | 0.000 |
| 28 | 0.000 | 0.000 |
| 29 | 0.000 | 0.000 |
| 30 | 0.000 | 0.000 |
| 31 | 0.000 | 0.000 |

Provided that samples in the time domain in the first 64-sample $T_1$ match corresponding samples in $T_2$ at the single-antenna device 110, the phases and amplitudes of each subcarrier after an FFT of the samples in $T_1$ will also match the phases and amplitudes of each subcarrier after an FFT of the samples in $T_2$. If the samples in the time domain do not match, however, the phases and amplitudes of the subcarriers will also not match.

The channel between the transmitter 120 and the single-antenna 110 may modify the transmitted signal because the signal takes multiple paths while in flight, reflecting off or passing through objects in the environment. These multipath signals add up constructively or destructively at the single-antenna device 110, and the result is that the samples are not received with the same phase and amplitude with which they were transmitted. This signal change suggests the possibility that samples in $T_1$ may not have the same phase and amplitude as the corresponding sample in $T_2$ when the signal is received. However, the disclosure below demonstrates that those samples match or substantially match (except for random noise) when the single-antenna device 110 is not in a near-field region of the transmitter 120.

The channel between the transmitter 120 and the single-antenna 110 may be modeled by Equation 1, below:

$$y[i]=Hx[i]+w[i] \qquad \text{(Equation 1)}$$

In this equation, y[i] is the i-th received sample, H is the channel matrix representing the changes to the signal caused by the channel, x[i] is i-th the transmitted sample, and w[i] is noise received with sample i. In a static environment (e.g., no moving objects), H is time invariant and causes the same shift in phase and amplitude for all samples in x because all transmitted samples take the same multipaths from sender to single-antenna device 110. Neglecting noise, the result is that sample y[i] still matches sample y[i+64] in phase and amplitude, even though they no longer match x[i] due to the effects of H.

This phase and amplitude change in the received sample compared with the transmitted sample is normal for wireless communication and is one of the reasons why Wi-Fi uses a preamble. The phase and amplitude of the preamble samples are pre-defined by the Wi-Fi specification and are known to both the transmitter 120 and the single-antenna 110. The transmitter 120 sends the preamble at the predefined phase and amplitude and the single-antenna device 110 uses these known phase and amplitude values in the STF to detect the start of the frame and apply a coarse frequency correction. Next it uses the LTF to synchronize symbol timing and apply fine frequency correction. Finally, because each subcarrier may be impacted differently by the channel, the single-antenna device 110 performs an FFT of the received time-domain signal to independently measure the phase and amplitude of each frequency-domain subcarrier in the LTF. The single-antenna device 110 computes the difference from the known transmitted phases and amplitudes for each subcarrier (see FIG. 3) and the received phases and amplitudes to estimate the channel's impact on each subcarrier. This estimate is called Channel State Information or CSI. The single-antenna device 110 uses this estimate from the LTF to correct for the channel's effects.

In Equation 1, it is assumed that H is time invariant so corresponding samples in $T_1$ and $T_2$ will be received with identical phase and amplitude (except for noise). In some scenarios, however, the transmitter 120, the single-antenna 110, or other objects may be moving and that movement may impact the signal. A channel is said to be coherent if it is stable over a particular time interval. If the channel is coherent over a coherence time, $T_c$, for the corresponding portions of the preamble, then the corresponding samples will be received with the same phase and amplitude. For example, assuming Wi-Fi samples at 20 MHz, meaning it takes 20 million samples per second, the time for one sample, $T_s$, is then 1/(20,000,000 samples/second), which equates to 50 ns. $T_1$ and $T_2$ are a total of 128 samples long, and the coherence time $T_c$ for determining whether $T_1$ matches $T_2$ is 6.4 µs (50 ns/sample×128 samples=6.4 µs). That is, if the channel is stable over 6.4 µs, then $T_1$ will match $T_2$ (aside from noise).

Moving objects can potentially cause a mismatch by changing the length of the signal's path as it travels from the transmitter 120 to the single-antenna device 110. The length of the path affects the phase and amplitude of the signal according to Equation 2, below:

$$H = \sum_{p=1}^{P} a_p e^{-j2\pi d_p/\lambda} \qquad \text{(Equation 2)}$$

In this equation, j is the square root of −1, $a_p$ is the attenuation of the signal along the path p, $d_p$ is the length of path p, P is the number of paths, and A is the signal's wavelength. The length of path p may change as the transmitter 120, the single-antenna device 110, or multipath-inducing objects move. To cause a significant change in the signal between corresponding samples, however, the movement would need to cause a change in path length of more than one-quarter wavelength (and one-half wavelength to cause maximum change). In Wi-Fi's 2.4 GHz band, the wavelength A is approximately 12 cm, suggesting that an object would need to move approximately $\lambda/4 \approx 3$ cm in 6.4 μs to significantly impact the phase and amplitude between corresponding LTF samples. This translates to a speed of over 17,000 km/hour (and roughly twice this speed for Wi-Fi's 5 GHz band). Given the extraordinary speed an object would need to be moving to cause a substantial change in path length in the short coherence time needed for the preamble, changing path lengths is eliminated as a possible explanation for corresponding LTF samples to have different phases and amplitudes.

Figure 4:
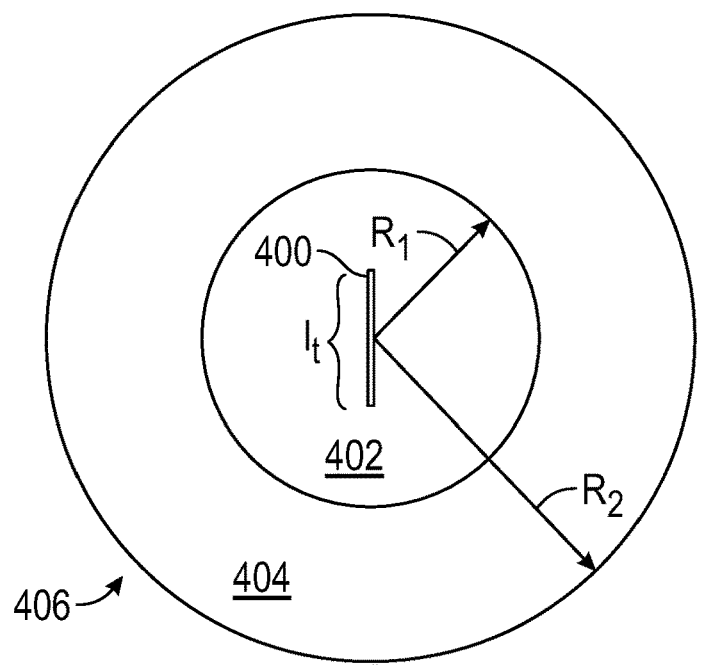
FIG. 4 illustrates a plurality of regions surrounding a transmitting antenna.

FIG. 4 illustrates a plurality of regions surrounding a transmitting antenna. In this illustrated example, the transmitting antenna may exemplify the at least one antenna (not illustrated) included in the transmitter 120 of FIG. 1. The plurality of regions surrounding the transmitting antenna include: (1) the reactive near-field, which is closest to the transmitting antenna, (2) the radiating near-field, which begins after the reactive near-field, and (3) the far-field, which begins after the radiating near-field and extends to infinity. It should be appreciated that the boundaries between the regions are not sharp, but instead transition gradually.

Figure 5:
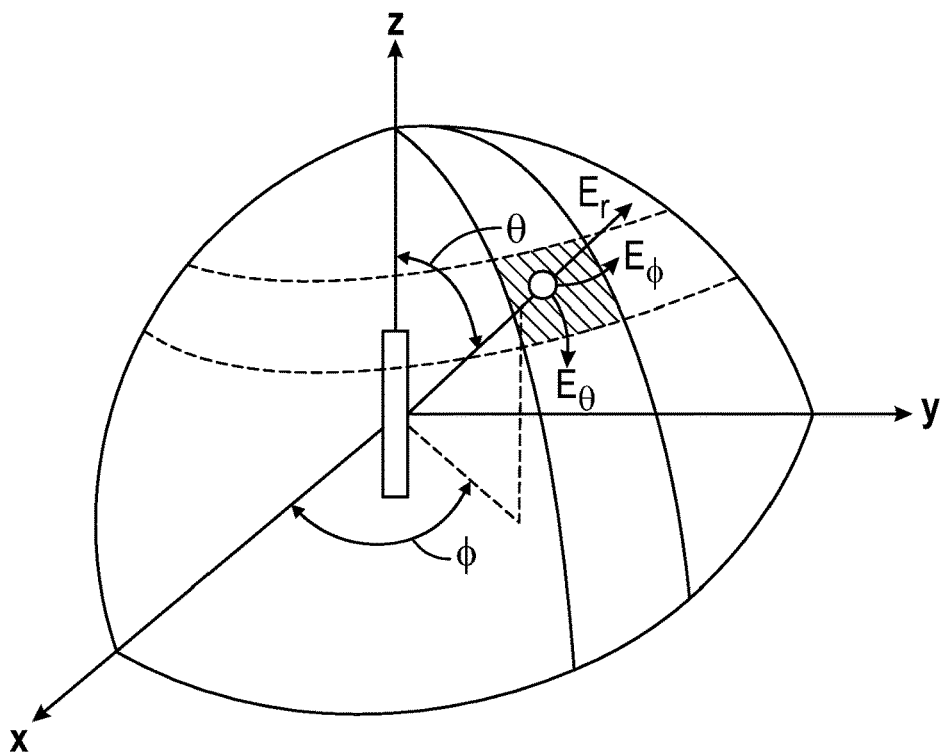
FIG. 5 illustrates the orientation of a transmitting antenna in a three dimensional space and a signal propagating from the transmitting antenna.

FIG. 5 illustrates the orientation of the transmitting antenna of FIG. 4 in a three-dimensional space and a signal propagating from the transmitting antenna of FIG. 4. In this illustrated example, it is assumed that the transmitting antenna is aligned vertically with the z axis. The magnetic fields H of the signal relative to each axis are determined by Equations 3a and 3b, below:

$$H_r = H_\theta = 0 \qquad \text{(Equation 3a)}$$

$$H_\phi = j\frac{\kappa I_0 l_t \sin\theta}{4\pi r}\left[1 + \frac{1}{jkr}\right]e^{-jkr} \qquad \text{(Equation 3b)}$$

The electric fields $E$ are determined by Equations 4a, 4b, and 4c below:

$$E_r = \eta\frac{I_0 l_t \cos\theta}{2\pi r}\left[1 + \frac{1}{jkr} - \frac{1}{(kr)^2}\right]e^{-jkr} \qquad \text{(Equation 4a)}$$

$$E_\theta = j\eta\frac{K I_0 l_t \sin\theta}{4\pi r}\left[1 + \frac{1}{jkr} - \frac{1}{(kr)^2}\right]e^{-jkr} \qquad \text{(Equation 4b)}$$

$$E_\phi = 0 \qquad \text{(Equation 4c)}$$

In these equations, $j=\sqrt{-1}$, $k=2\pi/\lambda$ is the wavenumber, $I_0$ is current applied to the transmitter 120, $l_t$ is the length of the transmitting antenna, $\eta=120\pi$ is the intrinsic impedance of free space, $\theta$ is the vertical angle between the transmitter 120 and the single-antenna device 110, $\phi$ is the horizontal angle between the transmitter 120 and the single-antenna 110, and r is the distance extending radially from the transmitter 120.

Returning to FIG. 4, the reactive near-field region is the region closest to the transmitting antenna, where kr<1 (or equivalently, where r<$\lambda/2\pi$). In this region, the reactive (e.g., non-radiating) field dominates and there is a high content of non-propagating stored energy. Here, the wavefront is not spherical because the electric and magnetic fields are not yet aligned, and in addition to the radiated energy described by the first term in brackets in Equations (3b), (4a), and (4b), there is a great deal of stored, non-propagating energy because the second and third terms inside the brackets dominate at close range.

With real antennas, the reactive near-field region is commonly estimated to extend from the surface of the antenna to roughly $R_1$, wherein $R_1$ is defined by Equation 5, below:

$$R_1 = 0.62\sqrt{D^3/\lambda} \qquad \text{(Equation 5)}$$

In this equation, $D=l_t+l_r$ is combined length of the transmitting antenna, $l_t$, and the receiving antenna, $l_r$, and $\lambda$ is the signal wavelength. In some examples, with Wi-Fi 2.4 GHz band, and quarter-wavelength dipole antennas, this region extends to roughly 2.7 cm from the transmitter 120. In some examples, with Wi-Fi's 5 GHz band, this region extends to roughly 1.1 cm.

The radiating near-field region is an area between the reactive near-field and far-field regions. In this region, kr>1 and the electric and magnetic fields are predominantly in phase, but the wavefront is still not yet spherical as it is in the far-field region. In view of Equations 3b and 4a, unlike in the reactive near field, the first term in the brackets (i.e., "1") begins to dominate the second term (i.e., "1/jkr") because kr is greater than one. Likewise, in Equation 4b, the first term in the brackets (i.e., "1") begins to dominate the second (i.e., "1/jkr") and third terms (1/(kr)^2). Because of the increasing value of kr compared with the reactive near-field region, the energy in the radiating near field is largely real, that is, radiated energy.

Based on the magnetic fields H and the electric fields E, the average power of the signal, W, may be estimated based on Equation 6, below:

$$W = \frac{1}{2}(E \times H^*) \qquad \text{(Equation 6)}$$

In this equation, * denotes complex conjugate and E and H are determined using Equations 3 and 4. W can be decomposed into its radial, Wr, and vertical, W$\theta$ components as Equations 7a and 7b, below:

$$W_r = \frac{\eta}{8}\left|\frac{I_0 l_t}{\lambda}\right|^2 \frac{\sin^2\theta}{r^2}\left[1 - j\frac{1}{(kr)^3}\right] \qquad \text{(Equation 7a)}$$

$$W_\theta = j\eta\frac{k|I_0 l_t|^2 \cos\theta \sin\theta}{16\pi^2 r^3}\left[1 + \frac{1}{(kr)^2}\right] \qquad \text{(Equation 7b)}$$

Figure 6:
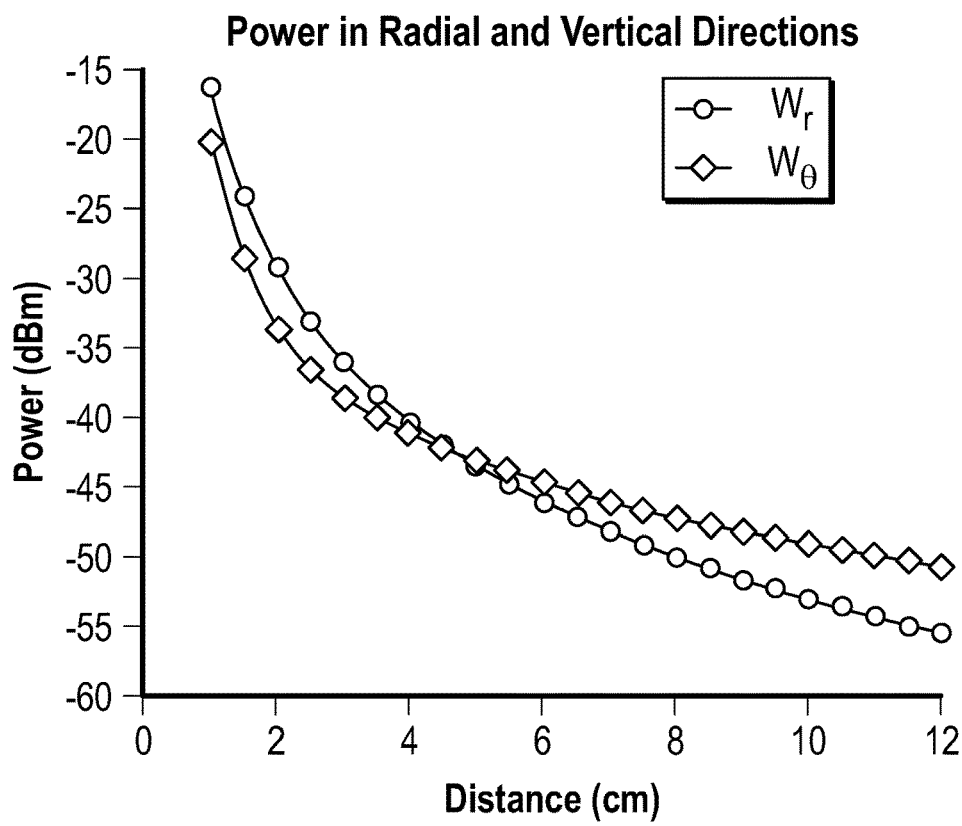
FIG. 6 illustrates an example graph of power of radial and vertical components of a signal transmitted from a transmitter to a single-antenna device.

FIG. 6 illustrates an example graph of power of the radial and vertical components of a signal transmitted from the transmitter 120 to the single-antenna device 110. In this illustrated example, it is assumed that the signal is transmitted via Wi-Fi's 2.4 GHz band with quarter-wavelength antennas. In the illustrated example, at distances larger than roughly 5 cm, the W$\theta$ component begins to dominate the $W_r$ component. At distances closer than about 5 cm, the radial component is stronger than the vertical component. This relative strength suggests that the power pulses inward and outward near the transmitter 120, whereas, at greater distances, the radial component dies out and vertical component takes over. This vertical component domination is indicative of signals in the far-field region, whereas radial component domination is indicative of signals in the radiating near-field region.

With real antennas, the radiating near-field region is commonly estimated to extend from $R_1$ to $R_2$, where $R_2$ is defined by Equation 8:

$$R_2 = 2D^2/\lambda \qquad \text{(Equation 8)}$$

In this Equation, $D=l_t+l_r$ is combined length of the transmitting antenna, $l_t$, and the receiving antenna, $l_r$, and λ is the signal wavelength. With Wi-Fi's 2.4 GHz band and quarter-wavelength dipole antennas, Equation 8 suggests that the radiating near-field region extends to approximately 6.2 cm from the transmitter 120. This estimate roughly matches the results shown in FIG. 6 using Equation 7, where the vertical component of the energy begins to dominate as it does it the far-field.

The-far field is the area far from the transmitting antenna where kr>>1. Because kr is large in the far-field, several of the terms in Equations 3 and 4 become extremely small and the E and H fields can be approximated by Equations 9a, 9b, and 9c, below:

$$E_\theta \simeq j\eta \frac{kI_0 l_t e^{-jkr}}{4\pi r} \sin\theta \quad \text{(Equation 9a)}$$

$$E_r \simeq E_\phi = H_r = H_\theta = 0 \quad \text{(Equation 9b)}$$

$$H_\phi \simeq j\frac{kI_0 l_t e^{-jkr}}{4\pi r}\sin\theta \quad \text{(Equation 9c)}$$

In Equations 9a, 9b, and 9c, the electric and magnetic fields are aligned orthogonal to each other (e.g., θ is orthogonal to φ), transverse to the direction of propagation, and are in time synchronization. This alignment creates a spherical wavefront with average power given by Equation 6.

At ranges closer than roughly $R_2$, the overall E and H fields are not in phase with respect to time, and because those fields do not have equal magnitude, they form a vector that rotates in time in a plane parallel to the direction of propagation, rather than the stable orthogonal relationship in the far-field region. As such, using such properties of change in phase and amplitude in the near-field region and the far-field region, the single-antenna device 110 may determine whether the received signal is transmitted from a trusted source or an adversary. Details in which the single-antenna device 110 renders such determination will be described with example embodiments below.

Returning to FIG. 1, once the single-antenna device 110 receives the signal including at least one Wi-Fi frame, the single-antenna device 110 may determine whether the received signal is provided from a trusted source (e.g., the transmitter 120). Example embodiments in which the single-antenna device 110 renders said determination will be described in detail below.

In certain embodiments, once the single-antenna device 110 receives the signal including at least one Wi-Fi frame, the single-antenna device 110 calculates a total Euclidean distance between the phase and amplitude of subcarriers in the two 64-sample OFDM symbols $T_1$ and $T_2$ of the LTF. The total Euclidean distance may be calculated based on Equation 10, below:

$$E_j = \sum_{k=-32}^{31} \left[ (\Re(Y_1[k]) - \Re(Y_2[k]))^2 + (\Im(Y_1[k]) - \Im(Y_2[k]))^2 \right]^{\frac{1}{2}} \quad \text{(Equation 10)}$$

In this equation, $E_j$ is the total Euclidean distance between the phase and amplitude of all subcarriers k for frame j, and where $Y_1$ is the result of an FFT over $T_1$ and $Y_2$ is the result of an FFT over $T_2$, $\Re(Y_x)[k]$ is the real component and $\Im(Y_x[k])$ is the imaginary component of each subcarrier k in $Y_x$, for x∈{1, 2}. Herein, this difference $E_j$ is the preamble deviation of a frame. If the subcarriers in the two corresponding portions of the LTF are substantially the same, the preamble deviation may be small, whereas, if the subcarriers are different in the two corresponding portions of the LTF, then the preamble deviation is large.

In certain embodiments, once the single-antenna device 110 calculates the preamble deviation of a frame, it compares the same to a threshold, τ. If the single-antenna device 110 determines that the preamble deviation for a frame is greater than τ, the single-antenna device declares proximity and determines that the received signal is transmitted from a trusted source. Otherwise, it does not declare proximity and determines that the received signal is transmitted from an untrusted or adversarial source.

Figure 7:
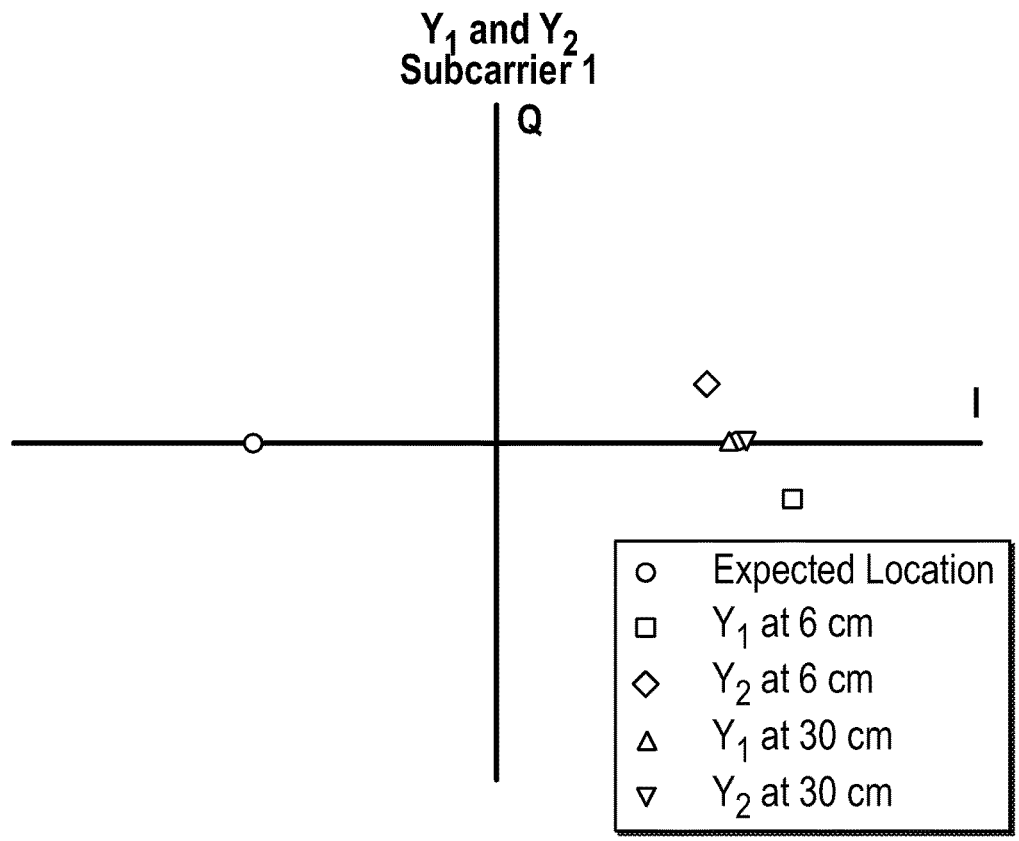
FIG. 7 illustrates an example constellation diagram showing a distance between $Y_1$ and $Y_2$ for a subcarrier.

FIG. 7 illustrates an example constellation diagram showing the distance between $Y_1$ and $Y_2$ for a subcarrier. Specifically, the constellation diagram shows the distance between $Y_1$ and $Y_2$ for a subcarrier of one frame when the transmitter 120 is located at 6 cm from the single-antenna device 110 and for the subcarrier of another frame sent from 30 cm. In this illustrated example, $Y_1$ matches or substantially matches $Y_2$ at 30 cm, but at 6 cm, $Y_1$ does not match $Y_2$ due to near-field effects as discussed above with reference to FIGS. 4-6.

Figure 8:
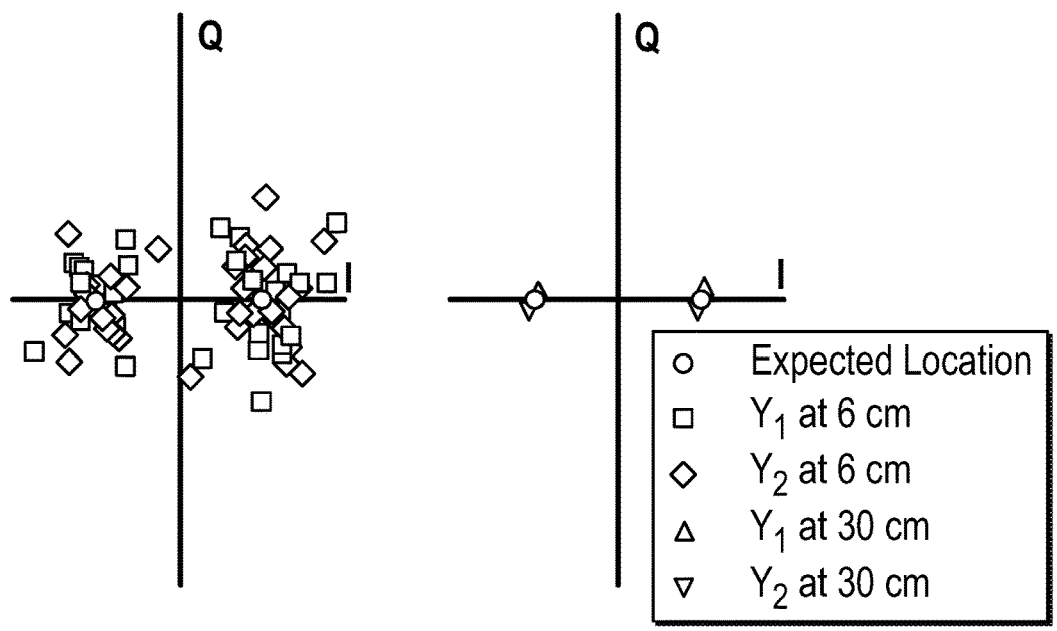
FIG. 8 illustrates an example constellation diagram showing the distance between $Y_1$ and $Y_2$ for all subcarriers of one frame.

FIG. 8 illustrates example constellation diagrams showing the distance between $Y_1$ and $Y_2$ for all subcarriers of one frame. The right example constellation diagram illustrates $Y_1$ and $Y_2$ for all subcarriers at 30 cm, and the left example constellation diagram illustrates $Y_1$ and $Y_2$ for all subcarriers at 6 cm. At 30 cm, $Y_1$ and $Y_2$ match or substantially match for all subcarriers, but at 6 cm, many subcarriers do not match.

Figure 9:
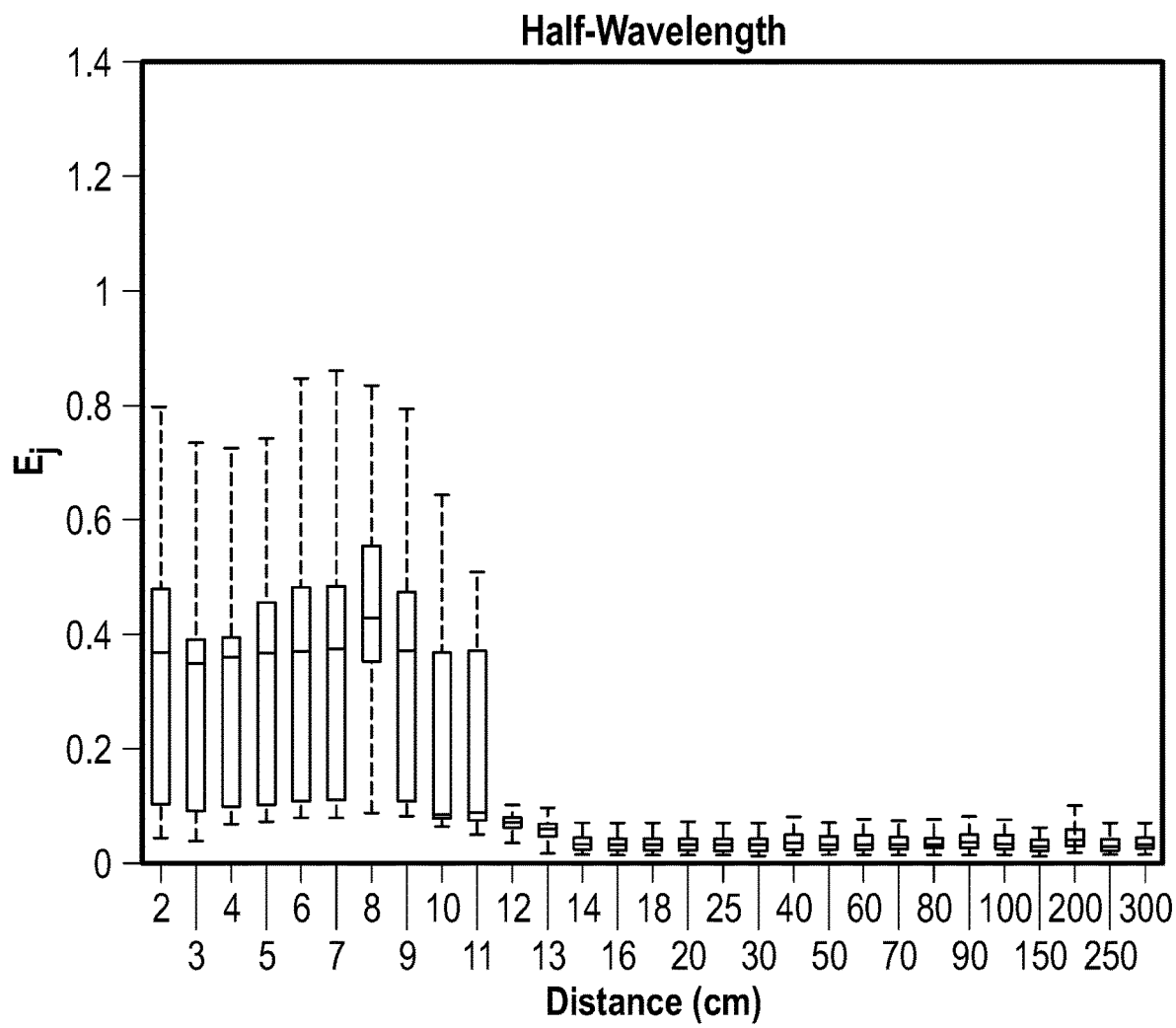
FIG. 9 illustrates an example distribution graph of preamble deviations for 1,000 Wi-Fi frames received from the transmitting antenna.

FIG. 9 illustrates an example distribution graph of preamble deviations for 1,000 Wi-Fi frames received from the transmitting antenna. In the illustrated example, the line in the box indicates the median value, the box indicates the 75$^{th}$ and 25$^{th}$ percentile, and the whiskers indicate the maximum and minimum value. For this illustrated example, it is assumed that the transmitting antenna is a half-wavelength dipole antenna. In this illustrated example, $E_j$ at close range is typically large but varies due to near-field effects. At long range (greater than about 12 cm) the preamble deviation is small and has much lower variance because the near-field effects have attenuated to near zero, as modeled in Equations 3 and 4. For brevity, the distributions from other types of transmitting antennas have been omitted, however, it should be appreciated that they follow a similar pattern, with each having small preamble deviations and low variability beyond about 12 cm.

In certain embodiments, the single-antenna device 110 may further calculate an average preamble deviation over a number of frames for a given antenna based on Equation 11, as provided below:

$$A_t = \frac{1}{n}\sum_{j=1}^{n} E_j \quad \text{(Equation 11)}$$

In this equation, t is the type of antenna used to send Wi-Fi frames, and n is the number of frames received.

Figure 10:
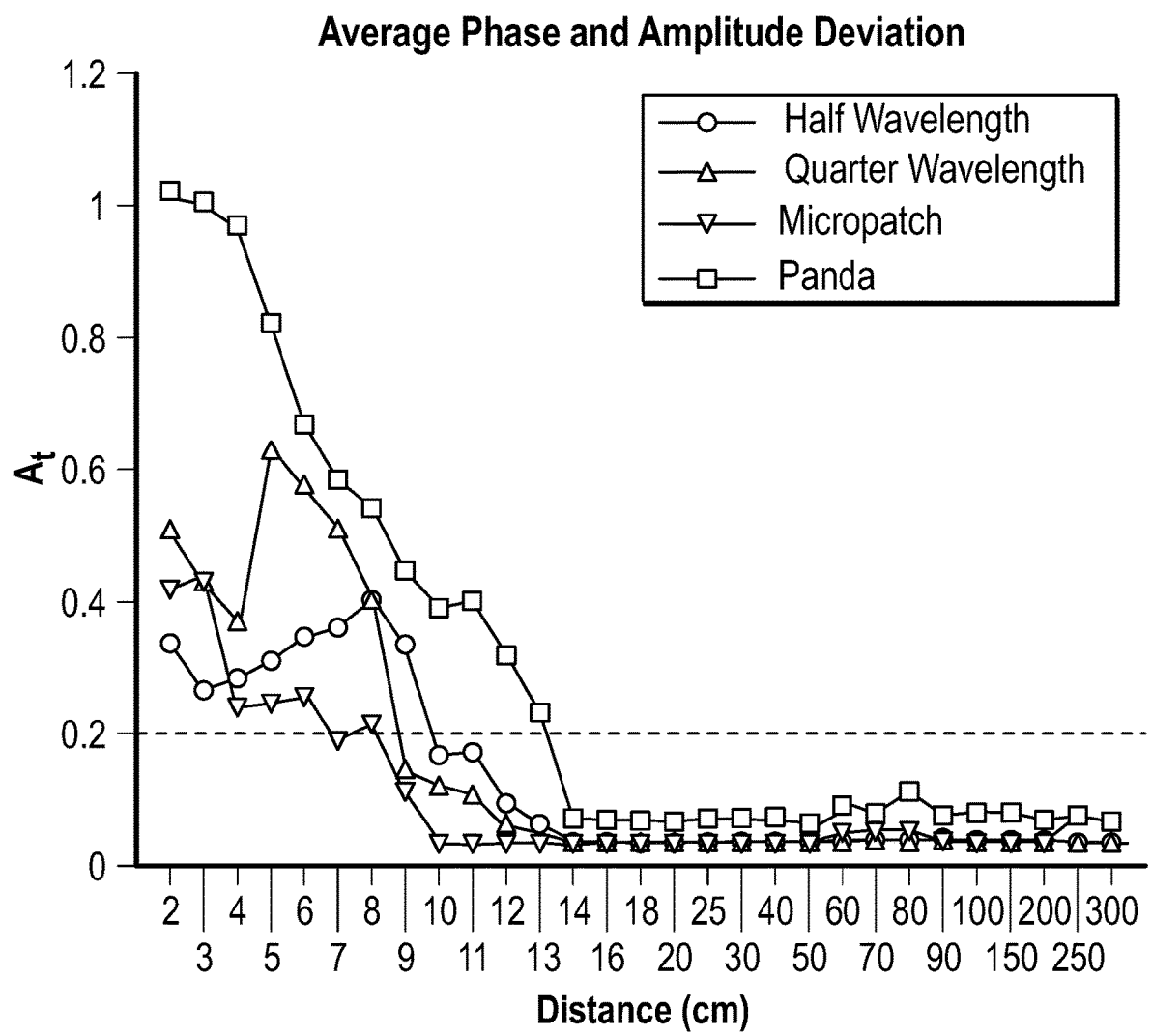
FIG. 10 illustrates an example graph of average preamble deviations of a plurality of frames transmitted over a plurality of distances for each antenna type.

FIG. 10 illustrates an example graph of average preamble deviations over a plurality of frames transmitted over a plurality of distances for each of a plurality of transmitting antenna types. In this illustrated example, the plurality of frames are 1,000 frames, the transmitting antenna types include half-wavelength dipole, quarter-wavelength dipole, micropatch, and Panda Wireless® Panda Ultra Wireless N USB Adapter, and the plurality of distances range from 2 cm to 300 cm. As modeled in the disclosure above with reference to FIGS. 4-6, large average preamble deviations occur at short range (e.g., 2-8 cm), and small average preamble deviations occur at distances beyond roughly 12 cm. This relationship holds across all of the transmitting antenna types and indicates that a single-antenna device 110 is operable to monitor the average preamble deviation and declare proximity when the average preamble deviation rises above a predetermined threshold. While this illustrated example demonstrates change in average preamble deviations based on certain types of transmitting antennas, it should be appreciated that this relationship further holds across any other types of transmitting antennas.

In certain embodiments, the threshold $\tau$ may be set to 0.2 (as indicated by the dashed line in FIG. 10) or around 0.2. since none of the average preamble deviations are over the threshold for any of the transmitting antenna types at distances over 14 cm, setting the threshold $\tau$ to 0.2 ensures that the single-antenna device 110 does not falsely declare proximity when the transmitter 120 is far away.

Figure 11:
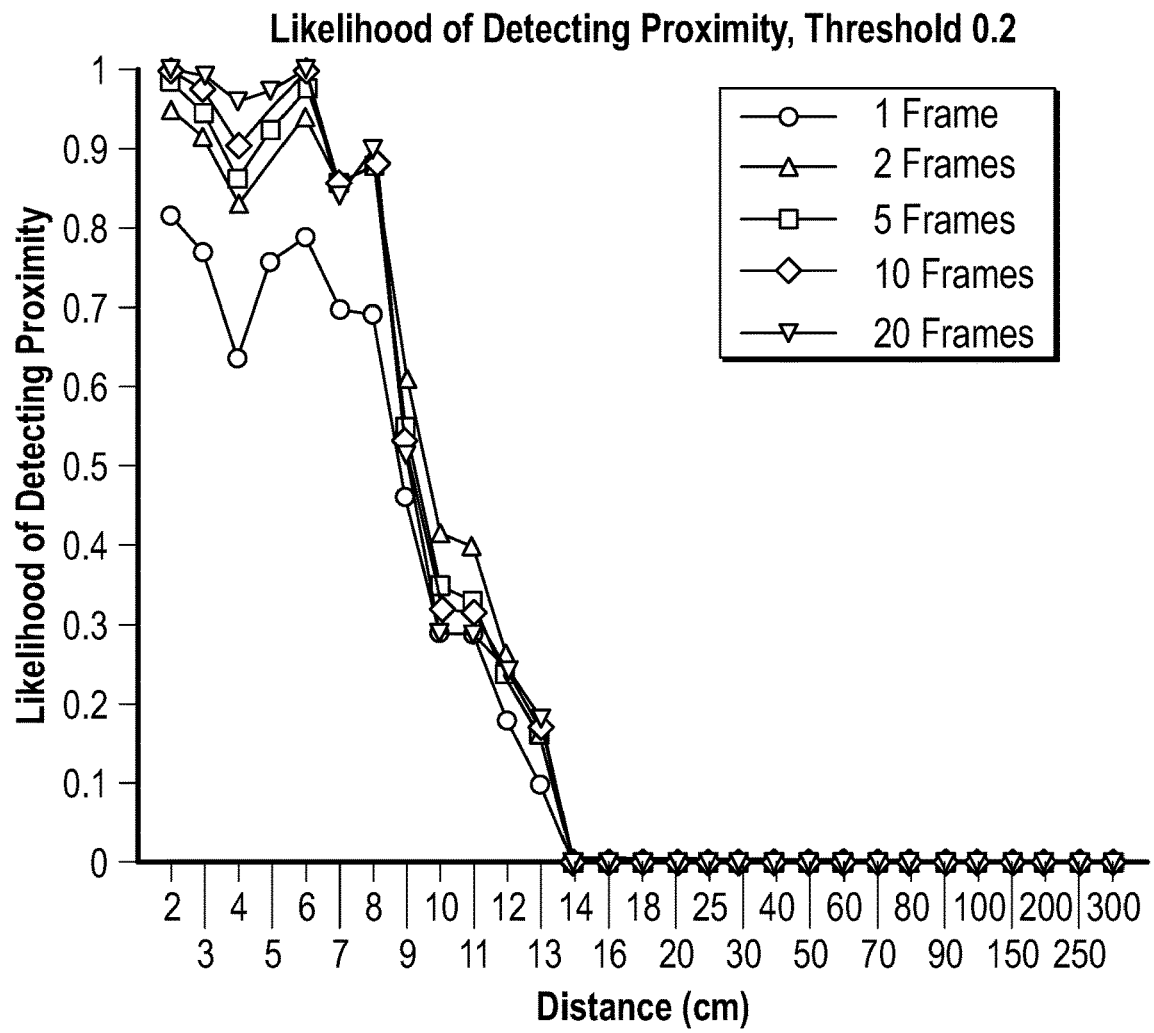
FIG. 11 illustrates an example graph of a likelihood of detecting proximity using average preamble deviations.

In some situations, if the single-antenna device 110 uses only one frame to determine proximity, it could be the case that said frame happens to have a low preamble deviation as indicated by the whiskers in FIG. 9, and the single-antenna device 110 may fail to recognize proximity even though it should. Such situations suggest that proximity detection may benefit from measuring the preamble deviation from multiple frames before declaring proximity. Therefore, in certain embodiments, instead of relying on the preamble deviation from a single frame, the single-antenna device 110 may: (1) calculate the average preamble deviation based on two or more frames; (2) compare that average value with the threshold $\tau$; and (3) declare proximity based on the comparison. FIG. 11 demonstrates the benefit of using multiple frames for declaring proximity.

FIG. 11 illustrates an example graph of the likelihood of detecting proximity using the average preamble deviations. The example graph is created via a Monte Carlo simulation. In the Monte Carlo simulation, a number of frames from the 1,000 Wi-Fi frames captured at each distance between the transmitter 120 and single-antenna device 110 is randomly sampled, and an average preamble deviation is calculated over those number of frames. Specifically, the example graph represents the likelihood of declaring proximity from 1,000 runs of the Monte Carlo simulation that randomly selected $n \in \{1, 2, 5, 10, 20\}$ Wi-Fi frames at each distance with $\tau=0.2$. The results shown are the average over all of the transmitting antenna types, as described with reference to FIG. 10. In this illustrated example, the likelihood of declaring proximity is high when the transmitter 120, regardless of antenna type, is within about 9 cm (i.e., the effective range of preamble detection) and when the single-antenna device 110 uses more than one frame. Using more than two frames results in improved detection probability, however, the amount of improvement decreases as the number of frames used increases.

In certain embodiments, if the single-antenna device 110 declares proximity and determines that the received signal is transmitted from a trusted source, the single-antenna device 110 may accept the data of the current frame and/or that of the other frame(s) in the received signal. If the single-antenna device 110 does not declare proximity and determines that the received signal is transmitted from an untrusted or adversarial source, the single-antenna device 110 may reject the data of the current frame and/or that of the other frame(s) in the received signal.

In some situations, the adversarial communication device 130 may be capable of transmitting a malformed preamble where $T_1$ does not match $T_2$ in an attempt to trick the single-antenna device 110 into falsely declaring proximity. To overcome an adversary transmitting malformed preambles, the single-antenna device 110 may communicate with a communication device having a pre-existing trusted relationship with the single-antenna device 110.

Figure 12:
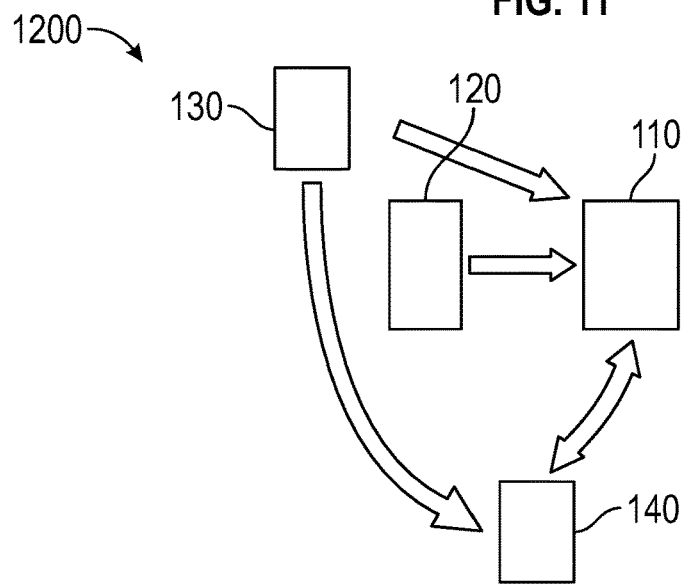
FIG. 12 illustrates another example system comprising a plurality of communication devices.

FIG. 12 illustrates another example system 1200 comprising a plurality of communication devices. The plurality of communication devices include the single-antenna device 110, the transmitter 120, the adversarial communication device 130, and a trusted communication device 140. The trusted communication device 140 may include at least one antenna, memory, and processor. In the illustrated example, the trusted communication device 140 has a pre-existing trusted relationship with the single-antenna device 110. In this illustrated example, the trusted communication device 140 may be a Wi-Fi router. It should be appreciated that the trusted communication device 140 may be other types of communication devices. In the illustrated example, the trusted communication device 140 is positioned further away from the single-antenna device 110 than the transmitter 120.

In certain embodiments, once the single-antenna device 110 determines that the preamble deviation of the repeating portion for one or more frames of the received signal is greater than $\tau$, the single-antenna device 110 may determine whether the trusted communication device 140 is located equal to or greater than a predetermined distance apart from the single-antenna device 110 by communicating with the trusted communication device 140. The predetermined distance may be two times the effective range of the preamble detection to rule out a legitimate transmitter 120 positioned in between the single-antenna device 110 and the trusted communication device 140. If the single-antenna device 110 determines that the trusted communication device 140 is located equal to or greater than the predetermined distance apart from the single-antenna device 110, the single-antenna device 110 may request a response from the trusted communication device 140 as to whether the trusted communication device 140 sees a matching preamble from the source that transmitted the received signal. If the preamble is purposely malformed, both the single-antenna device 110 and the trusted communication device 140 will see the high preamble deviation. Therefore, if the response indicates that the preamble deviation of the repeating portion for one or more frames of a signal received at the trusted communication device 140 is greater than $\tau$, the single-antenna device 110 may determine that the received signal is transmitted from the adversarial communication device 130 and reject the received signal, and if the response indicates that the preamble deviation of the repeating portion for one or more frames of the signal received at the trusted communication device 140 is greater than $\tau$, the single-antenna device 110 may determine that the received signal is transmitted from the adversarial communication device 130 and reject the received signal.

In some situations, a trusted device may not be readily available within proximity of the single-antenna device 110.

In certain embodiments, the single-antenna device 110 may examine the strength of the received signal when it detects a high preamble deviation. Since signal strength drops with the square of distance, a distant adversary will need to transmit a high-power signal for the single-antenna device 110 to receive it with the same strength as a signal from a legitimate device located a few centimeters away. To prevent the distant adversary from tricking the single-antenna device 110 into believing that the malformed preambles are legitimate signals from a nearby device, the single-antenna device 110 can measure the signal strength of frames with high preamble deviations and reject frames with a signal strength below a threshold.

In some situations, proximity is necessary, but may not be a sufficient indicator of trust. In many cases, a user may not want his/her devices to pair with other devices that are physically close. For example, in a crowded subway, people may be packed together tightly. Any devices they wear or carry may then come into unintended proximity with other devices. In those use cases, where devices may encounter untrusted devices, the single-antenna device 110 may perform proximity detection only when the user provides an input (e.g., physical input or voice command), rather than blindly trusting nearby devices. Proximity detection used in conjunction with user intent may help prevent distant adversaries from tricking legitimate devices into accepting malicious frames.

In certain embodiments, in response to receiving a user input for initiating the proximity detection process, the single-antenna device 110 may provide an instruction (e.g., either visually via a display device or audibly via a speaker) for a user to place the transmitter 120 in a close proximity with the single-antenna device 110 for establishing secure short-range information exchange. In certain embodiments, the single-antenna device 110 may wait for a predetermined amount of time after providing the instruction.

While the example embodiments described above exemplify proximity detection based on Wi-Fi communication protocol, it should be appreciated that proximity detection is further applicable to other communication protocols that include a repeating portion. For example, said communication protocols may include Zigbee, Bluetooth, Bluetooth Low Energy, etc.

FIGS. 13A and 13B illustrate an example flowchart of a method for establishing secure short-range information exchange between a single-antenna device and a transmitting device.

At block 1302, the single-antenna device determines whether a user input has been provided for initiating proximity detection. If so, the method continues to block 1304. Otherwise, the method terminates.

At block 1304, the single-antenna device determines whether a signal comprising at least one Wi-Fi frame has been received. If so, the method continues to block 1306. Otherwise, the method returns to block 1304.

At block 1306, the single-antenna device calculates the preamble deviation for one or more frames of the received signal. Alternatively, the single-antenna device may determine an average preamble deviation based on two or more frames of the received signal.

At block 1308, the single-antenna device determines whether the preamble deviation of one or more frames of the received signal is greater than a threshold $\tau$. If so, the method continues to block 1310. Otherwise, the single-antenna device may compare average preamble deviation for two or more frames of the received signal with the threshold $\tau$. If so, the method continues to block 1310. Otherwise, the method continues to block 1320.

At block 1310, the single-antenna device determines whether a trusted communication device is disposed at or greater than a predetermined distance apart from the single-antenna device. If so, the method continues to block 1312. Otherwise, the method continues to block 1316.

At block 1312, the single-antenna device requests the trusted communication device to examine a signal transmitted from the same source.

At block 1314, the single-antenna device receives a response from the trusted communication device and determines whether the trusted communication device indicates that the preamble deviation of one or more frames of the signal received at the trusted communication device is greater than the threshold $\tau$. If so, the method continues to block 1320. Otherwise, the method continues to block 1318. Alternatively, the single-antenna device receives the response from the trusted communication device and determines whether the trusted communication device indicates that an average preamble deviation of two or more frames of the signal received at the trusted communication device is greater than the threshold $\tau$. If so, the method continues to block 1320. Otherwise, the method continues to block 1318.

At block 1316, the single-antenna device determines whether the signal strength of one or more frames of the received signal is greater than a threshold. If so, the method continues to block 1318. Otherwise, the method continues to block 1320.

At block 1318, the single-antenna determines that the received signal is transmitted from a trusted source and accepts one or more frames of the received signal.

At block 1320, the single-antenna determine that the received signal is transmitted from an adversary and rejects one or more frames of the received signal.

Figure 13:
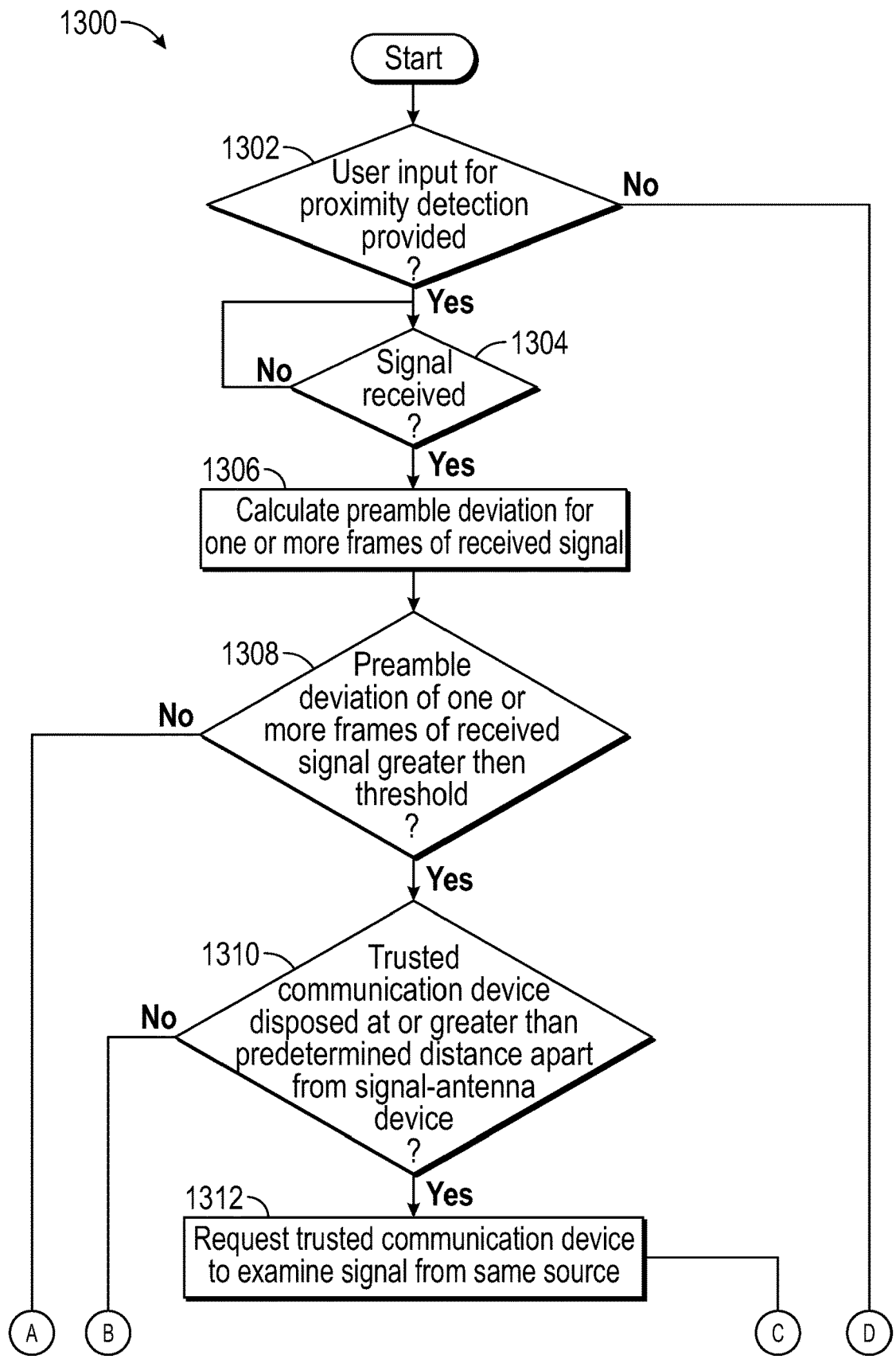
FIGS. 13A and 13B illustrate an example flowchart of a method for establishing secure short-range information exchange between a single-antenna device and a transmitting device.
Figure 13:
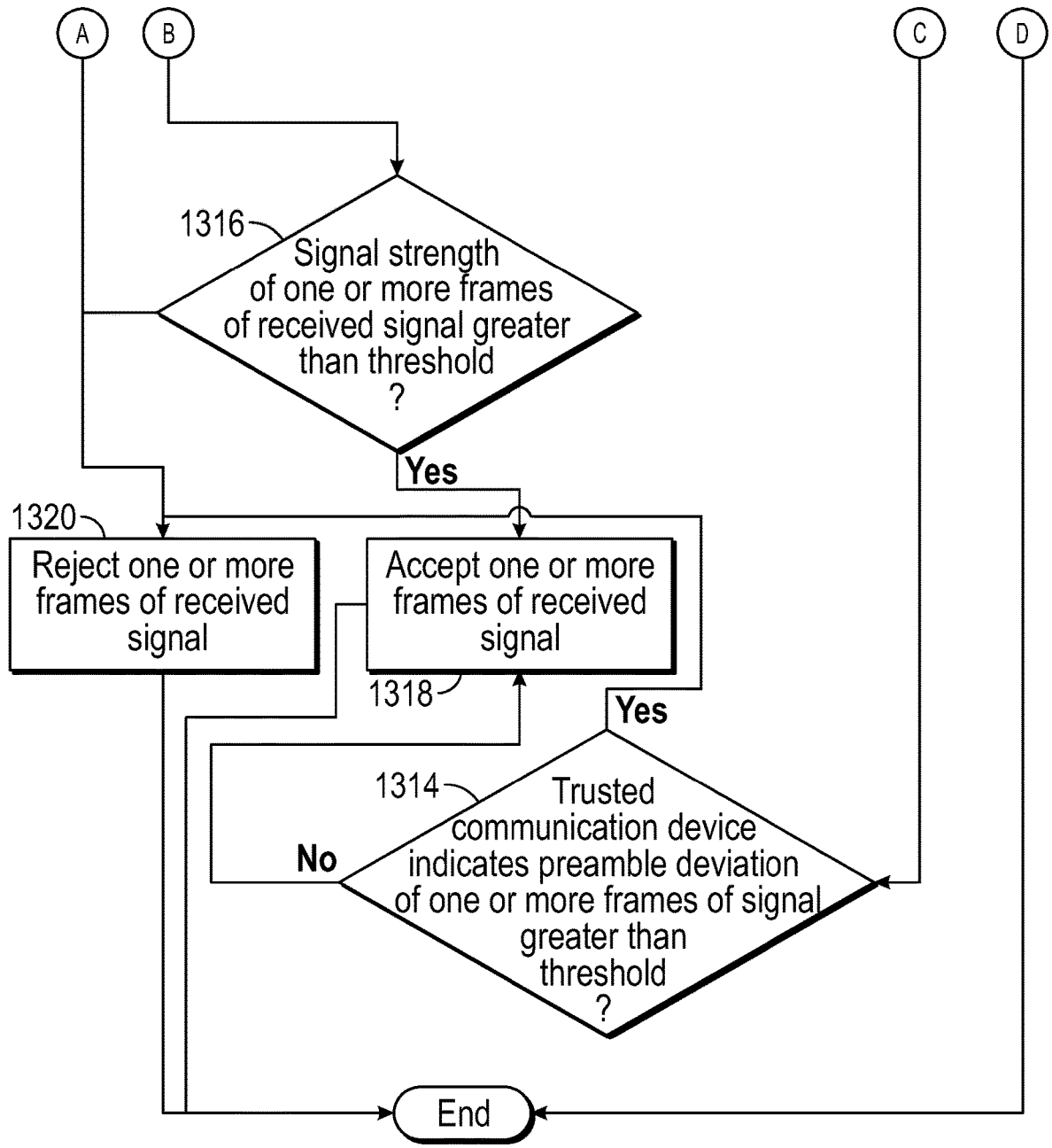

The flowchart of FIG. 13 is representative of machine-readable instructions stored in memory (such as the memory 116 of FIG. 1) that are executable by a processor (such as the processor 114 of FIG. 1). Although the example program(s) is/are described with reference to the flowchart illustrated in FIGS. 13A and 13B, many other methods may alternatively be performed. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A non-transitory computer readable medium storing instructions executable by at least one processor, the instructions, when executed by said processor, cause said processor to operate with a single antenna to:
   receive a wireless signal comprising at least one frame, each of said frame comprising a repeating portion;
   determine a difference of phase and amplitude of the repeating portion; and
   determine whether the wireless signal is transmitted from a trusted source based at least in part on the difference of phase and amplitude of the repeating portion.

2. The non-transitory computer readable medium of claim 1, wherein each of said frame comprises a preamble, and wherein the preamble comprises the repeating portion.

3. The non-transitory computer readable medium of claim 1, wherein each of said frame comprises a Long Training Field (LTF), and wherein the LTF comprises the repeating portion.

4. The non-transitory computer readable medium of claim 1, wherein the repeating portion comprises:
   a first set of symbols; and
   a second set of symbols, wherein the second set of symbols is a repeat of the first set of symbols.

5. The non-transitory computer readable medium of claim 4, wherein, to determine the difference of the phase and amplitude of the repeating portion, the instructions, when executed by said processor, cause said processor to calculate a value, wherein the value corresponds to a difference between phase and amplitude of the first set of symbols and phase and amplitude of the second set of symbols.

6. The non-transitory computer readable medium of claim 5, wherein the instructions, when executed by said processor, cause said processor to:
   compare the value to a threshold;
   responsive to the value being greater than the threshold, determine that the wireless signal is transmitted from the trusted source; and
   responsive to the value being less than the threshold, determine that the wireless signal is transmitted from an adversary.

7. The non-transitory computer readable medium of claim 6, wherein the instructions, when executed by said processor, cause said processor to:
   responsive to determining that the wireless signal is transmitted from the trusted source, accept the wireless signal; and
   responsive to determining that the wireless signal is transmitted from the adversary, reject the wireless signal.

8. The non-transitory computer readable medium of claim 1, wherein the instructions, when executed by said processor, cause said processor to:
   calculate an average preamble deviation based on two or more frames comprised within the wireless signal;
   compare the average preamble deviation to a threshold;
   responsive to the average preamble deviation being greater than the threshold, determine that the wireless signal is transmitted from the trusted source; and
   responsive to the average preamble deviation being less than the threshold, determine that the wireless signal is transmitted from an adversary.

9. The non-transitory computer readable medium of claim 1, wherein the wireless signal is transmitted from a transmitter, wherein the difference of phase and amplitude of the repeating portion is a first difference of phase and amplitude of the repeating portion, and wherein, the instructions, when executed by said processor, cause said processor and the single antenna to:
   responsive to the first difference of phase and amplitude of the repeating portion being greater than a threshold, communicate with a trusted communication device to determine whether the trusted communication device is located at or greater than a predetermined distance apart from the single-antenna device;
   responsive to determining that the trusted communication device is located at or greater than the predetermined distance apart from the single-antenna device, request the trusted communication device to:
   receive, from the transmitter, the wireless signal;
   determine a second difference of phase and amplitude of the repeating portion; and
   compare the second difference to the threshold; and
   responsive to receiving a response from the trusted communication device indicating that the second difference is greater than the threshold, determine that the wireless signal is transmitted from an adversary.

10. The non-transitory computer readable medium of claim 1, wherein the threshold is a first threshold, and wherein, the instructions, when executed by said processor, cause said processor and the single antenna to:
    responsive to determining that the difference of phase and amplitude of the repeating portion is greater than the first threshold, measure a wireless signal strength of said frame;
    responsive to the wireless signal strength being greater than a second threshold, determine that the wireless signal is transmitted from the trusted source; and
    responsive to the wireless signal strength being less than the second threshold, determine that the wireless signal is transmitted from an adversary.

11. The non-transitory computer readable medium of claim 1, wherein said frame is at least one Wi-Fi frame.

12. A method comprising:
    receiving, at a single-antenna device comprising a single antenna, a wireless signal comprising at least one frame, each of said frame comprising a repeating portion;
    determining a difference of phase and amplitude of the repeating portion; and
    determining whether the wireless signal is transmitted from a trusted source based at least in part on the difference of phase and amplitude of the repeating portion.

13. The method of claim 12, wherein each of said frame comprises a preamble, and wherein the preamble comprises the repeating portion.

14. The method of claim 12, wherein each of said frame comprises a Long Training Field (LTF), and wherein the LTF comprises the repeating portion.

15. The method of claim 12, wherein the repeating portion comprises:
    a first set of symbols; and
    a second set of symbols, wherein the second set of symbols is a repeat of the first set of symbols.

16. The method of claim 15, wherein the determining the difference of the phase and amplitude of the repeating portion comprises calculating a value, wherein the value corresponds to a difference between phase and amplitude of the first set of symbols and phase and amplitude of the second set of symbols.

17. The method of claim 16, further comprising:
comparing the value to a threshold;
responsive to the value being greater than the threshold, determining that the wireless signal is transmitted from the trusted source; and
responsive to the value being less than the threshold, determining that the wireless signal is transmitted from an adversary.

18. The method of claim 17, further comprising:
responsive to determining that the wireless signal is transmitted from the trusted source, accepting the wireless signal; and
responsive to determining that the wireless signal is transmitted from the adversary, rejecting the wireless signal.

19. The method of claim 12, further comprising:
calculating an average preamble deviation based on two or more frames comprised within the wireless signal;
comparing the average preamble deviation to a threshold;
responsive to the average preamble deviation being greater than the threshold, determining that the wireless signal is transmitted from the trusted source; and
responsive to the average preamble deviation being less than the threshold, determining that the wireless signal is transmitted from an adversary.

20. The method of claim 12, wherein the wireless signal is transmitted from a transmitter, and wherein the difference of phase and amplitude of the repeating portion is a first difference of phase and amplitude of the repeating portion, the method further comprising:
responsive to the first difference of phase and amplitude of the repeating portion being greater than a threshold, communicating with a trusted communication device to determine whether the trusted communication device is located at or greater than a predetermined distance apart from the single-antenna device;
responsive to determining that the trusted communication device is located at or greater than the predetermined distance apart from the single-antenna device, requesting the trusted communication device to:
receive, from the transmitter, the wireless signal;
determine a second difference of phase and amplitude of the repeating portion; and
compare the second difference to the threshold; and
responsive to receiving a response from the trusted communication device indicating that the second difference is greater than the threshold, determining that the wireless signal is transmitted from an adversary.

21. The method of claim 12, wherein the threshold is a first threshold, the method further comprising:
responsive to determining that the difference of phase and amplitude of the repeating portion is greater than the first threshold, measuring a wireless signal strength of said frame;
responsive to the wireless signal strength being greater than a second threshold, determining that the wireless signal is transmitted from the trusted source; and
responsive to the wireless signal strength being less than the second threshold, determining that the wireless signal is transmitted from an adversary.

22. The method of claim 12, wherein said frame is at least one Wi-Fi frame.

* * * * *